(12) United States Patent
Liotta et al.

(10) Patent No.: US 12,188,852 B2
(45) Date of Patent: Jan. 7, 2025

(54) LASER CAPTURE MICRODISSECTION VISUALIZATION CHEMISTRY

(71) Applicant: George Mason Research Foundation, Inc., Fairfax, VA (US)

(72) Inventors: Lance A. Liotta, Bethesda, MD (US); Alessandra Luchini Kunkel, Burke, VA (US); Marissa Ashton Howard, Richmond, VA (US); Amanda Haymond Still, Manassas, VA (US); Amanda Lynn Still, Herndon, VA (US); Virginia Espina, Fairfax, VA (US)

(73) Assignee: George Mason Research Foundation, Inc.

( * ) Notice: Subject to any disclaimer, the term of this patent is extended or adjusted under 35 U.S.C. 154(b) by 0 days.

(21) Appl. No.: 18/036,283

(22) PCT Filed: Nov. 10, 2021

(86) PCT No.: PCT/US2021/058788
§ 371 (c)(1),
(2) Date: May 10, 2023

(87) PCT Pub. No.: WO2022/103843
PCT Pub. Date: May 19, 2022

(65) Prior Publication Data
US 2023/0384187 A1 Nov. 30, 2023

Related U.S. Application Data

(60) Provisional application No. 63/112,321, filed on Nov. 11, 2020.

(51) Int. Cl.
*G01N 1/30* (2006.01)
*G01N 1/28* (2006.01)
*G02B 21/33* (2006.01)

(52) U.S. Cl.
CPC .............. *G01N 1/30* (2013.01); *G02B 21/33* (2013.01); *G01N 2001/284* (2013.01)

(58) Field of Classification Search
CPC ..... G01N 1/30; G01N 2001/284; G02B 21/33
See application file for complete search history.

(56) References Cited

U.S. PATENT DOCUMENTS 6,184,027 B1 * 2/2001 Laine ............. C12Y 302/01017
435/261
8,796,028 B2 8/2014 Hollander
(Continued)

FOREIGN PATENT DOCUMENTS

CN 111238893 6/2020
KR 20200022989 A * 3/2020 ............... G01N 1/30
(Continued)

OTHER PUBLICATIONS

Scott, "Refractive index of Ethanol-Water Mixtures and Density and Refractive Index of Ethanol-Water-Ethyl Ether Mixtures", 1946, American Chemical Society, pp. 406-412. (Year: 1946).*
(Continued)

*Primary Examiner* — Jennifer Wecker
*Assistant Examiner* — Kathryn Elizabeth Limbaugh
(74) *Attorney, Agent, or Firm* — Raj S. Dave; Dave Law Group LLC

(57) ABSTRACT

A liquid including an organic component, a stabilization component, and a preservation component is provided. The organic component, the stabilization component, and the preservation component are different components. The organic component present in the liquid includes a volatile organic solution with a refractive index of 1.5 or below. Further, the liquid is a visualization solution that provides a resolving power of a lens by 1/1.5.

15 Claims, 13 Drawing Sheets

(56) References Cited

U.S. PATENT DOCUMENTS

| | | |
|---|---|---|
| 10,401,266 B2 | 9/2019 | Kuehnel et al. |
| 2001/0038449 A1 | 11/2001 | Baer et al. |
| 2009/0046192 A1 | 2/2009 | Molnar et al. |
| 2010/0081579 A1* | 4/2010 | Bushway .......... G01N 33/54393 506/13 |
| 2015/0147779 A1* | 5/2015 | Simon ..................... G01N 1/30 435/40.5 |
| 2018/0088308 A1 | 3/2018 | Liu et al. |

FOREIGN PATENT DOCUMENTS

| | | | |
|---|---|---|---|
| WO | WO-87/06621 | 11/1987 | |
| WO | WO-03/052418 | 6/2003 | |
| WO | WO-2013/126902 | 8/2013 | |
| WO | WO-2015199976 A1 * | 12/2015 | ............... G01N 1/08 |
| WO | WO-2016041890 A2 * | 3/2016 | ............... G01N 1/30 |
| WO | WO-2019/129646 A | 7/2019 | |
| WO | WO-2019/246033 A1 | 12/2019 | |

OTHER PUBLICATIONS

Espacenet English Translation of KR 10-2020-0022989. (Year: 2020).*
D. R. Caprette, Light Microscopy, Retrieved from https://www.ruf.rice.edu/~bioslabs/methods/microscopy/microscopy.html, last updated Aug. 2012.
International Search Report and Written Opinion dated Feb. 24, 2022, PCT Application No. PCT/US2021/058788, 8 pages.

\* cited by examiner

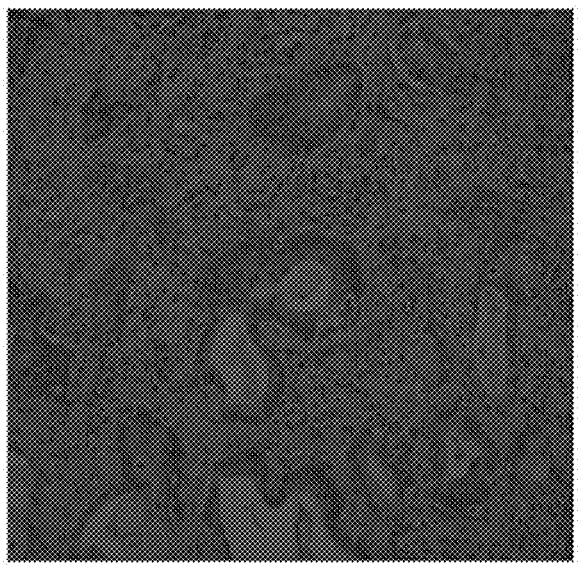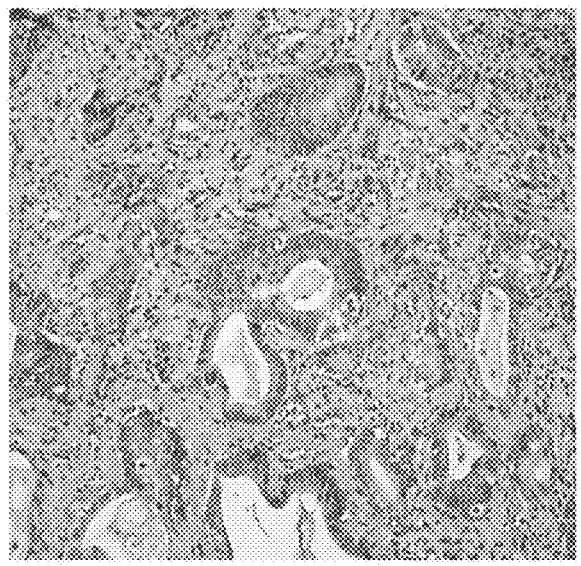
FIG. 2A     FIG. 2B

BEFORE WATER　　　　　AFTER WATER

R.I.=1.33
NO DISSOLVING

BEFORE ACN　　　　　AFTER ACN

R.I.=1.34
NO DISSOLVING

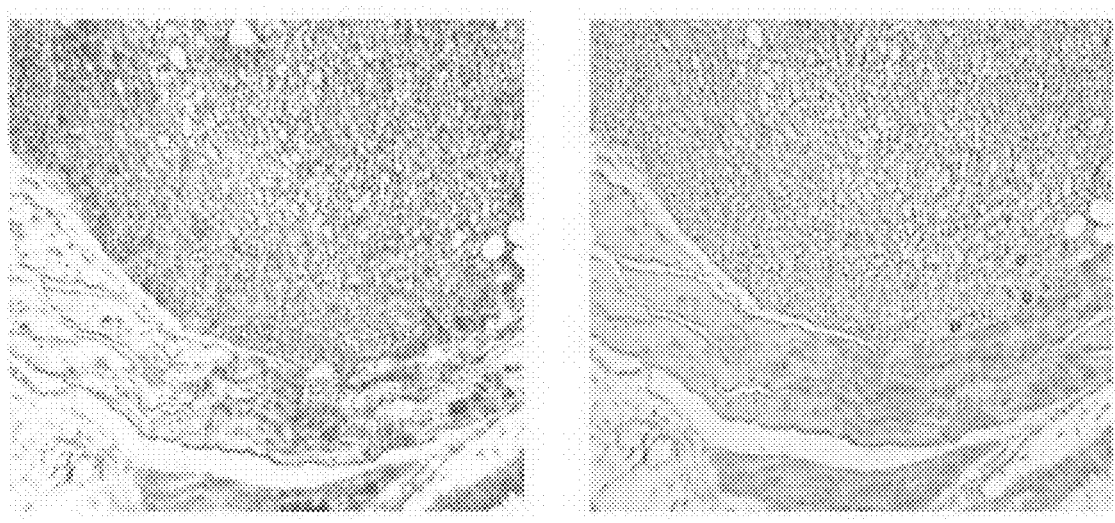
BEFORE ETOH  AFTER ETOH ACN
R.I.=1.36
NO DISSOLVING
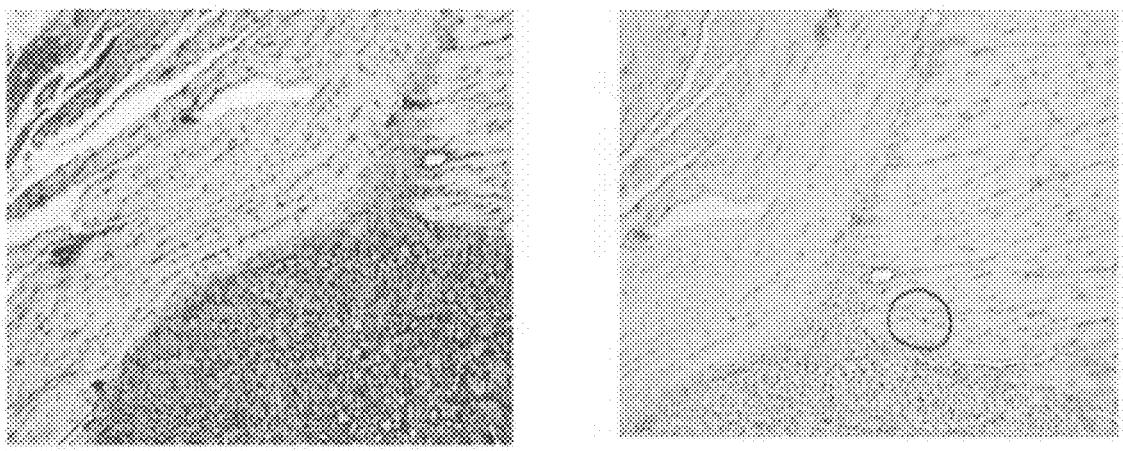
BEFORE ETOH  AFTER ETOH ACN
R.I.=1.36
NO DISSOLVING
FIG.3C

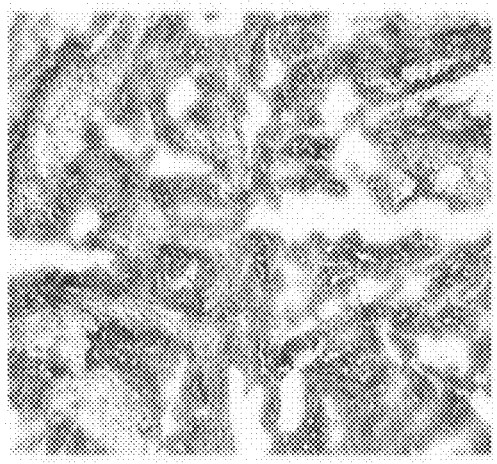 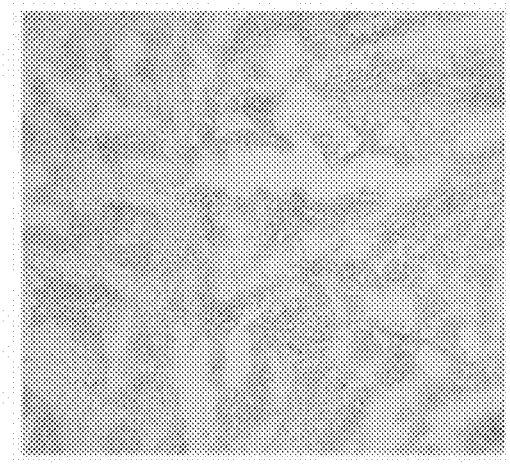
BEFORE ISOPROPANOL      AFTER ISOPROPANOL
R.I.=1.37
DISSOLVED EVA
FIG.3D
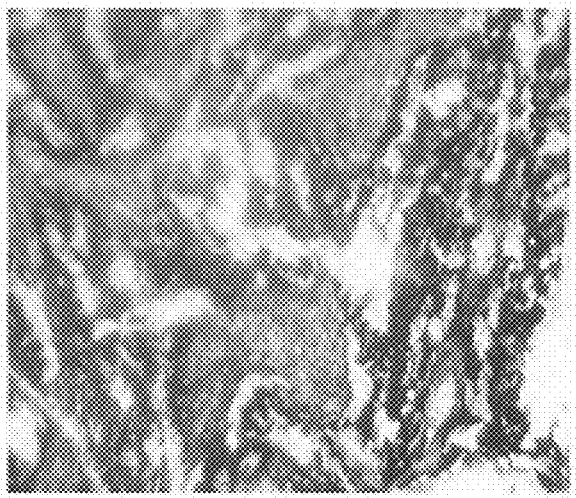 
BEFORE THA    R.I.=1.40    AFTER THA
DISSOLVED EVA
FIG.3E

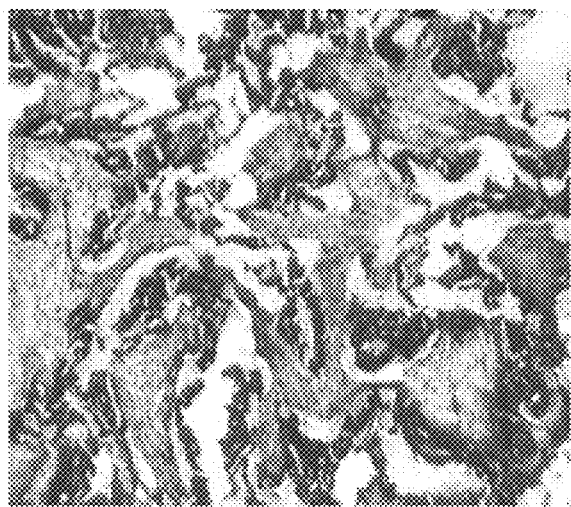 
BEFORE XYLENE     AFTER XYLENE
R.I.=1.49
DISSOLVED EVA
FIG.3F

LASER CAPTURE MICRODISSECTION VISUALIZATION CHEMISTRY

CROSS-REFERENCE TO RELATED APPLICATIONS

This application claims priority to U.S. Provisional Patent Application No. 63/112,321 filed Nov. 11, 2020, the entirety of which is incorporated herein by reference.

FIELD OF THE INVENTION

This invention relates to improving tissue visualization and digital image capture during microdissection for molecular diagnostics and digital pathology.

BACKGROUND OF INVENTION

In pathology, high fidelity images of the cellular morphology of healthy and diseased cells are important for diagnostic purposes and molecular analysis of specific cell subpopulations. The cells to be imaged, collected and analyzed, are obtainable from tissue biopsy samples, mammalian or bacterial cell cultures, or bulk plant material, for which select subpopulations of cells may be isolated from the sample using such technologies as Laser Capture Microdissection ("LCM") for further molecular analysis.

LCM employs a laser beam, or a source of radiation, to heat a thermal-polymer cap that is held against the slice of tissue mounted on a glass slide, or to cut the tissue, or a probe to suck up a portion of the tissue.

Visualization of the tissue sectioned slide for tissue molecular analysis, including Laser Capture Microdissection (LCM) or scanning MALDI, or probe/tool capture has been a problem since these tissue sampling methods were originally invented. The interface between the slide and microdissection or cellular analysis tool, such as the LCM cap, creates an air refractive index mismatch that distorts the image causing a darkening and loss of resolution and color, preventing the technician, or pathologist, from fully visualizing the tissue section. The visualization of the tissue is hindered because of the air pocket created between the tissue and the molecular procurement tool.

In the past, individuals have attempted to use common pathological fluids like oil immersion or mounting media to visualize the slide, however, these damages and glue the tissue, preventing downstream molecular analyses. Caprette, D. R. (2012) states "A disadvantage of oil immersion viewing is that the oil must stay in contact, and oil is viscous. A wet mount must be very secure to use oil. Oil immersion lenses are used only with oil, and oil cannot be used with dry lenses, such as your 400× lens. Lenses of high magnification must be brought very close to the specimen to focus and the focal plane is very shallow, so focusing can be difficult. Oil distorts images seen with dry lenses, so once you place oil on a slide it must be cleaned off thoroughly before using the high dry lens again. Oil on non-oil lenses will distort viewing and possibly damage the coatings." Others have tried the addition of water however the rehydration of the tissue prevents the laser from extracting the tissue. Further, the addition of other incompatible solvents damages the microdissection probe.

Therefore, there is long felt need for a solution that can be applied at the interface between the microdissection probe and tissue sample, to allow for improved visual inspection without harming the cellular capture process or downstream analyses.

SUMMARY

The present application relates to a visualization solution with, chemistries achieving refractive index matching and permeability of UV, IR and visual wavelengths, that improves the clarity of the tissue for high fidelity digital image capture, visual inspection, and high resolution molecular capture and analysis for diagnostic molecular profiling.

In an embodiment, the visualization solution is volatile with no interference with downstream molecular analysis. The visualization solution clears, dehydrates, and preserves the tissue diagnostic molecules without interfering with microdissection, digital imaging, and/or cell capture.

In an embodiment, the visualization solution can be sold as a pre-packaged article, to be used for existing molecular diagnostic labs and pathology departments worldwide.

In an embodiment, the present invention relates to an optimized image capture provided by the visualization solution.

The disclosure relates to a high-throughput LCM system that rapidly digitizes tissue slides without the existing requirement for a cover slip that prevents access to the tissue for molecular analysis. This digitized set of images can be analyzed either by a technician or by a developed machine learning algorithm to identify key histological regions of interest (ROIs) of the digitally scanned tissue slide. After downstream biological analyses, the software combines the data into a report displayed on the digital image of the tissue itself. The report includes the biological data within the ROIs the user has pre-selected or that the automated system has selected. Overall, this novel workflow with combined visualization solution will both improve microdissection efficiency and all types of molecular analysis for genomic profiling and proteomic profiling of tissue.

In an embodiment, a liquid includes a) an organic component; b) a stabilization component; and c) a preservation component, wherein the organic component, the stabilization component, and the preservation component are different components, wherein the organic component includes a volatile organic solution with a refractive index of 1.5 or below; wherein the liquid is configured to be a visualization solution that provides a resolving power of a lens by 1/1.5.

In an embodiment, the liquid includes the organic component has a vapor pressure of about 5 kPa to about 25 kPa at a temperature about 22° C., wherein a lower limit of the refractive index is about 1.3.

In an embodiment, the organic component is configured to transmit about 90% of an incident light with a wavelength in range of about 400 nm to about 800 nm.

In an embodiment, the volatile organic solution includes at least a short-chain alcohol, acetonitrile, or combination thereof.

In an embodiment, the short-chain alcohol includes methanol, ethanol and/or propanol or isomers thereof.

In an embodiment, the stabilization component includes hygroscopic salt, wherein the stabilization component is configured to absorb water from the organic component.

In an embodiment, the liquid does not dissolve a poly methyl methacrylate polymer and/or an ethylene vinyl acetate polymer.

In an embodiment, the preservation component includes a denaturant chemical component.

In an embodiment, the denaturant chemical component includes a chaotropic agent.

In an embodiment, a kit includes a) an organic component; b) a stabilization component, contained within a container.

In an embodiment, the container includes of a material inert to degradation via the organic component, wherein the organic component and the stabilization component are different components, wherein the organic component includes a volatile organic solution with a refractive index of 1.5 or below, wherein the container, as part of the kit is configured to contain a visualization solution that provides a resolving power of a lens by 1/1.5.

In an embodiment, the kit is in form of a squeeze applicator.

In an embodiment, the kit further includes a preservation component comprising a chaotropic agent.

In an embodiment, the organic component has a vapor pressure of about 5 kPa to about 25 kPa at a temperature about 22° C., wherein a lower limit of the refractive index is about 1.3.

In an embodiment, the organic component is configured to transmit about 90% of an incident light with a wavelength in range of about 400 nm to about 800 nm.

In an embodiment, the volatile organic solution includes at least a short-chain alcohol, acetonitrile, or combination thereof.

In an embodiment, the short-chain alcohol includes methanol, ethanol and/or propanol or isomers thereof.

In an embodiment, the stabilization component includes hygroscopic salt, wherein the stabilization component is configured to absorb water from the organic component.

In an embodiment, a system includes a) a visualization solution comprising a) an organic component; b) a stabilization component; and optionally c) a preservation component, wherein the organic component, the stabilization component, and the preservation component are different components, wherein the organic component includes a volatile organic solution with a refractive index of 1.5 or below; and b) a visualizing instrument.

In an embodiment, a system includes a) a visualization solution comprising a) an organic component; b) a stabilization component; and c) a preservation component, wherein the organic component, the stabilization component, and the preservation component are different components, wherein the organic component includes a volatile organic solution with a refractive index of 1.5 or below; and b) a visualizing instrument.

In an embodiment, the system further includes a first device to micro-dissect a sample placed on a slide without a coverslip.

In an embodiment, the system further includes a second device to generate a multi-omics data from a region of interest of the sample.

In an embodiment, the system further includes a third device to analyze the sample.

In an embodiment, the system including the liquid has an organic component of the visualization solution has a vapor pressure of about 5 kPa to about 25 kPa at a temperature about 22° C., wherein a lower limit of the refractive index is about 1.3.

In an embodiment, the visualization solution is configured to transmit about 90% of an incident light with a wavelength in range of about 400 nm to about 800 nm.

In an embodiment, the volatile organic solution includes at least a short-chain alcohol, acetonitrile, or combination thereof.

In an embodiment, the first device is a laser capture microdissection.

In an embodiment, the visualizing instrument is at least one of microscope, Laser Capture Microdissection, probe/tool capture, spectroscopy.

In an embodiment, the system is configured to be a high-throughput digitized system.

In an embodiment, the system is configured to be equipped with a camera system capable to scan and capture an image of a sample and convert the image into digitized form.

In an embodiment, the system includes an artificial intelligence configured software.

In an embodiment, a method includes a) applying the liquid of the present invention on a sample; and b) visualizing the sample using a visualizing instrument.

In an embodiment, the method further includes capturing an image of the sample and selecting a region of interest in the sample using the image.

In an embodiment, the method includes software comprising a database and is configured to display the region of interest with data.

In an embodiment, the method includes scanning the sample using a camera system for a high-throughput sample digitizing system.

In an embodiment, the visualizing instrument is at least one of microscope, a Laser Capture Microdissection apparatus (a Laser Capture Micro-dissector), a probe/tool capture device, or spectroscopy (a spectrometer or spectrometry device or system).

BRIEF DESCRIPTION OF THE FIGURES

FIG. 2A and FIG. 2B show an illustration of before (FIG. 2A) and after (FIG. 2B) the addition of a visualization fluid to a tissue sample. Before visualization, tissue staining colour are muted, the image is often dark, and some features are obscured. After visualization, normal colour is restored, and morphology is visible.

FIGS. 3A to 3F shows tissue sections imaged before and after the addition of investigated solvent. FIG. 3A shows tissue sections imaged before and after the addition of water. FIG. 3B shows tissue sections imaged before and after the addition of Acetonitrile (ACN), FIG. 3C shows tissue sections imaged before and after the addition of Ethanol (EtOH) improved tissue image without harming LCM cap. FIG. 3D shows tissue sections imaged before and after the addition of Isopropanol. FIG. 3E shows tissue sections imaged before and after the addition of Tetrahydrofuran (THF). FIG. 3F shows tissue sections imaged before and after the addition of Xylene, Isopropanol, Tetrahydrofuran (THF), and Xylene improved tissue image moderately but had effects on the LCM cap.

DETAILED DESCRIPTION

Definitions and General Techniques

Figure 1:
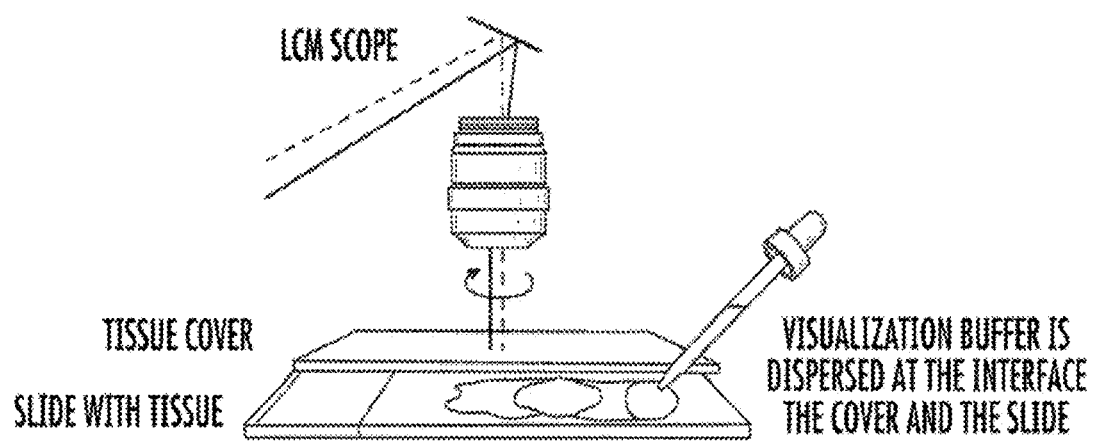
FIG. 1 shows a schematic of the administration of a visualization fluid to a tissue surface, which may or may not be covered by a tissue cover such as an LCM cap or an LCM sheet which adds in the selection of cell populations for downstream analysis.
Figure 3A:
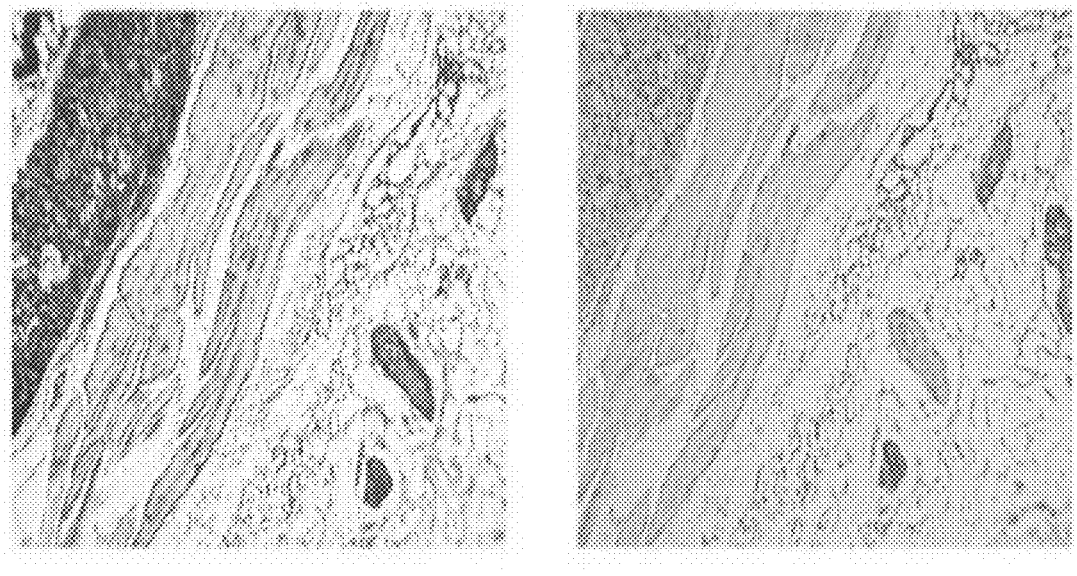
Figure 3B:
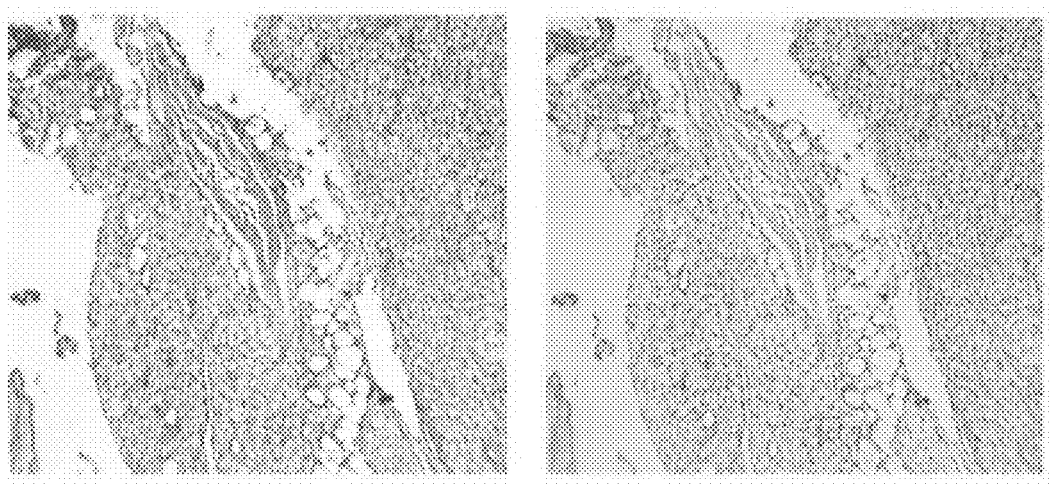

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denotes the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that includes a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As defined herein, two or more elements are "integral" if they are comprised of the same piece of material. As defined herein, two or more elements are "non-integral" if each is comprised of a different piece of material.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately", "about" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific, and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

For molecular analysis of a tissue section the analysis technology must have full access to the uncovered exposed surface of the tissue. An air or vacuum gap exists at the interface between the tissue on the glass slide and the microdissection or cellular analysis tool, such as the LCM cap, or other probes or capture methods used for molecular analysis of tissue sampling (Scanning MS/MALDI, mechanical probes or tools, and scanning probe capture). This creates an air refractive index miss-match that distorts the image, causing a darkening and loss of resolution and color which prevents the technician, pathologist, or digital camera from fully visualizing the actual tissue section during molecular sampling. The present invention of visualization chemistries represents an unmet need in pathology.

The following terms and phrases, unless otherwise indicated, shall be understood to have the following meanings.

"Sample" as used herein is used in its broadest sense and includes environmental and biological samples. Environmental samples include material from the environment such as soil and water. Biological samples may be animal, including, human, fluid (e.g., blood, plasma, serum, urine, saliva), solid (e.g., stool), tissue, liquid foods (e.g., milk), and solid foods (e.g., vegetables). For example, a pulmonary sample may be collected by broncho-alveolar lavage (BAL), which includes fluid and cells derived from lung tissues. Other examples of biological samples may include a cell, tissue extract, body fluid, chromosomes or extrachromosomal elements isolated from a cell, genomic DNA, RNA, cDNA, and the like. Samples may also include tissue sample "Tissue sample" as used herein is a piece of tissue removed from an organism, e.g. a biopsy, or a whole organ of an organism or even a whole organism.

"Chaotropic agent" is a substance which increases the entropy of the system by interfering with intramolecular interactions mediated by non-covalent forces such as hydrogen bonds, van der Waals forces, and hydrophobic effects. Chaotropic solutes can decrease the net hydrophobic effect of hydrophobic regions because of a disordering of water molecules adjacent to the protein. This solubilizes the hydrophobic region in the solution and may in some cases denature a protein. Chaotropic agents may shield charges and prevent the stabilization of salt bridges. Thus, a "chaotropic agent" as used herein is a molecule that—when solved in water—can disrupt the hydrogen bonding network between water molecules (i.e. exerts chaotropic activity). This influences the stability of the native state of other molecules in the solution, mainly macromolecules (proteins, nucleic acids) by weakening the hydrophobic effect. For example, a chaotropic agent reduces the amount of order in the structure of a protein formed by water molecules, both in the bulk and the hydration shells around hydrophobic amino acids and may cause its denaturation.

"Component" as used herein is a substance used for the purpose of detecting, measuring, examining, analyzing and/or preserving the sample. This term includes both organic and inorganic component.

"Data" as used herein is defined as facts and statics collected for reference or analysis. Data are measured, collected, and reported, and analyzed, whereupon it can be visualized using graphs, images, or other analysis tools. Data as a general concept refers to the facts or existing information or knowledge.

"Molecular analysis" as used herein is defined as a process governed by one or various techniques for analysis and identification of molecules such as nucleic acids, amino acids, peptides, proteins, polymers or biological markers in the genome and proteome as known to a person skilled in the art. For example, but not limited to proteomic analysis such as protein profiling, genetic analysis such as individual's genetic code and how their cells express their genes as protein, RNA profiling etc. In some embodiment, molecular analysis may refer to identification of cell type in a tissue sample. Molecular analysis is also defined as molecular profiling.

"Downstream molecular analysis" as used herein refers to further analytical study done on the sample after preselection or common procedure. For example: selection of region of interest is followed by molecular analysis of that region of interest.

"High throughput" as used herein is the use of automated equipment to rapidly test or analyze large number of samples varying from hundreds to millions of samples for biological activity at the model organism, cellular, pathway, or molecular level. Because high-throughput typically aims to screen thousands of samples per day, they may possess automation-compatible assay designs, robotic-assisted sample handling, and/or automated data processing.

"Interference" as used herein is broadly defined as property to interfere in processing, analyzing, or examining of the sample at any given stage. An interference may be a substance, other than the assayed material or sample, that can be measured by the chosen analytical method or that can prevent the assayed material or sample from being measured. Interferences cause erroneous analytical results.

"Inert" as used herein is defined as a substance that is not chemically reactive.

"LCM System" Laser capture microdissection (LCM) technique is a sample preparation technique that enables isolation of specific cells from a mixed population under microscopic visualization. This technique of isolating a pure sample from a heterogeneous mixture allows for more efficient and accurate results with downstream micro genomics applications such as next-generation sequencing, Sanger sequencing, PCR, and proteomics etc. "LCM" should be broadly understood to incorporate all commercially available LCM systems from diverse manufacturers.

"Permeability" as used herein is broadly defined ease of flow of rays through the solution or fluid.

"Preservation" as used herein is broadly defined as a process to prevent the degradation of sample. As used herein preservation may employ various denaturant chemical components such as but not limited to a strong acid such as acetic acid, trichloroacetic acid, sulfosalicylic acid or a base such as sodium hydroxide, sodium bicarbonate or a concentrated inorganic salt, an organic solvent such as ethanol, formaldehyde, glutaraldehyde or chaotropic agents such as urea, guanidinium chloride, lithium perchlorate, sodium dodecyl sulfate, or disulfide bond reducers such as 2-mercaptoethanol, Dithiothreitol, TCEP or chemically reactive agents such as hydrogen peroxide, elemental chlorine, hypochlorous acid (chlorine water), bromine, bromine water, iodine, nitic and oxidizing acids, etc.

"Optimized Image Capture" as used herein means optimized resolution, image clarity, optimized color fidelity, digital capture of an image such that the digital image approximates the clarity and fidelity of the same region of the tissue if it were viewed by eye.

"Region of interest (ROI)" as used herein is broadly defined as a sub-portion of a sample that is desired for study, analysis and/or examination from the sample. The sub-portion can include a cell, cellular organelle or subcellular element, or a biomolecule (such as a protein or nucleic acid). The ROI is sometimes (although not always) spread throughout the biological sample, but is characterized by a common physiochemical or biological property (such as recognition by a specific binding agent) that allows the target to be specifically recognized in the biological sample.

"Stabilization" as used herein can be broadly defined as a process to retain structural and functional integrity and activity of the sample.

"Refractive Index Matching" as used herein is a solution being adapted for optically clearing tissue samples of a particular type of tissue by determining the Refractive index (RI) of this tissue type empirically or by literature study.

"Visualizing Instrument" as used herein can be broadly defined as an instrument required to examine samples such as but not limited to microscopes, LCM, spectroscopy, capture/probe detecting instruments, and/or instruments that require examinations of a sample under lens.

"Clarity" as used herein, that facilitates imaging of tissues without cover slip.

"High fidelity" as used herein refers to high quality of image of the analyzed sample with distortion less than 5% such as less than 4%, less than 3%, less than 1%, less than 0.5%, less than 0.1% or less of the original image of the sample.

"Digital pathology" is a process of converting glass microscopy slides into high-resolution digital images. These images can be viewed, managed, analyzed and interpreted with a computer-based digital pathology workflow management system, instead of a microscope. This process allows faster and more accurate analysis and reporting, easy archival and retrieval of stored images and metadata, and facilitates transfer of digitized slides over shared networks for consultations, second opinions, education, and quality control.

"Multi-omics" is a biological analysis approach in which the data sets are multiple "omes" such as the genome, proteome, transcriptome, epigenome, metabolome, and microbiome (i.e., a meta genome and/or meta-transcriptome, depending upon how it is sequenced); in other words, the use of multiple omics technologies to study life in a concerted way. By combining these "omes" scientist can analyze complex biological big data to find novel associations between biological entities, pinpoint relevant biomarkers and build elaborate markers of disease and physiology. In doing so, multiomics integrates diverse omics data to find a coherently matching geno-pheno-envirotype relationship or association.

"Telepathology" is the practice of pathology at a distance. It uses telecommunications technology to facilitate the transfer of image-rich pathology data between distant locations for the purposes of diagnosis, education, and research. Performance of telepathology requires that a pathologist select the video images for analysis and rendering of diagnoses.

The present invention is described below through various embodiment:

The present application relates to a visualization solution with chemistries achieving refractive index matching and permeability of UV, IR and visual wavelengths, that improves the clarity of the tissue or sample for high fidelity digital image capture, visual inspection, and high resolution molecular capture and analysis for diagnostic molecular profiling. Throughout the specification visualization solution is also referred as solution or visualization chemistry.

The resolution of a microscope is defined as the minimum separation needed between two objects under examination for the microscope to discern them as a separate object. The resolving power of a lens is measured by its ability to differentiate two lines or points in an object. Greater the resolving power, smaller the minimum distance between two lines or points that can still be distinguished. This minimum distance is labelled δ. If two objects are separated by a distance shorter than δ, they will appear as a single object in the microscope. A measure of the resolving power, R. P., of a lens is given by its numerical aperture (NA): δ/2NA, where λ is the wavelength of light. From this a good resolution that is small δ, relates to a high numerical aperture. The numerical aperture is expressed as $n \sin \alpha_0$, where $\alpha_0$ is half the angle spanned by the lens seen from the sample and n is refractive index of the medium between lens and tissue. Because sin α0 is always less than or equal to unity (the number "1"). The numerical aperture can never be greater than unity for an objective lens in air. If the space between the objective lens and the specimen is filled with a fluid with the higher refractive index, the numerical aperture can obtain values greater than unity.

In an embodiment, the visualization solution allows analysis and visualization of sample placed on a naked slide without a cover slip. The absence of cover slip and direct visualization of sample through microscope, allow to perform microdissection of the sample as desired by user.

To carry out a histological analysis, or to carry out an analysis of biomolecules, in or from the biological sample, it is possible to employ all analytical methods which are known to the skilled worker and which he deems suitable, preferably methods selected from the group consisting of light microscopy, electron microscopy, confocal laser scanning microscopy, laser micro dissection, Scanning electron microscopy, Western blotting, Southern blotting, enzyme-linked immunosorbent assay (ELISA), immune precipitation, affinity chromatography, mutation analysis, polyacrylamide gel electrophoresis (PAGE), in particular two-dimensional PAGE, HPLC, polymerase chain reaction (PCR), RFLP analysis (restriction fragment length polymorphism analysis), SAGE analysis (serial analysis of gene expression), FPLC analysis (fast protein liquid chromatography), mass spectrometry, for example MALDI-TOF mass spectrometry or SELDI mass spectrometry, microarray analysis, LiquiChip analysis, enzyme activity analysis, HLA typing, sequencing, WGA (whole genome amplification), RT-PCR, real-time PCR or real-time RT-PCR, RNase protection analysis or primer extension analysis.

In an embodiment, visualization solution enables digital imaging without a cover slip. Digital image capture at high fidelity and resolution that can be integrated directly into automated molecular analysis of the same tissue without interference of the diagnostic workflow, without damaging the molecular composition of the tissue cells, without interfering with microdissection UV or IR methods, and fully maintaining the fidelity for pathologic diagnostic accuracy.

In an embodiment, the composition of matter visualization chemistry is novel. The chemistry can be the starting point for an integrated digital telepathology workflow solution in which the diagnostic information is displayed back on the actual tissue digital histologic image.

In an embodiment, the visualization chemistry can preserve RNA in the tissue. Rapid degradation of RNA in the open tissue section undergoing analysis severely hampers RNA yield for molecular analysis for any existing technology. Conventional RNA preservative (e.g. RNA-Later) damage morphology and are not volatile, thus interfering with the analysis.

In an embodiment, the composition of visualization solution is chosen such that the desired RI is reached.

In an embodiment, the visualization solution is volatile with no interference with downstream molecular analysis. The visualization solution clears, dehydrates, and preserves the tissue or sample diagnostic molecules without interfering with microdissection, digital imaging, and/or cell capture. The volatility as used herein is defined as volatility should such that 95 wt. % of the solution should evaporate within 5 minutes from a tissue soaked in the solution.

In an embodiment, the visualization solution is inert to the tissue such that there is no extraction of components of the tissue when the visualization solution leaves the tissue.

In an embodiment, the visualization solution is inert to the lenses such that liquid does not stick to the lenses.

In an embodiment, the visualization solution is one-step visualization and preservation step to improve the optical visualization of histologic tissue sections under microscopic evaluation and preserve the tissue analytes, useful for microdissection of histological tissue sections.

In an embodiment, the visualization solution includes one of more of the following elements: a volatile organic liquid chemical component, stabilization components, and preservation components.

In an embodiment, the volatile organic liquid chemical component includes of a short chain alcohol solvent such as but not limited to methanol, ethanol, propanol (any isomer such as isopropanol or combination of isomers such as but not limited to methanol and ethanol, methanol and propanol, methanol or isopropanol, ethanol and propanol, methanol and ethanol, ethanol and iso propanol or methanol-ethanol-propanol or methanol-ethanol-isopropanol etc.).

In an embodiment, the short chain alcohol as described herein includes to have carbon atoms from 1 to 10 carbons. The short chain alcohol could be mono alcohol, di alcohol, tri-alcohol, or any isomer thereof.

In another embodiment, the volatile organic liquid chemical component includes of a mixture of short chain alcohols solvent. In another embodiment, the volatile organic liquid chemical component could include acetonitrile. In another embodiment, the volatile organic liquid chemical component could include of acetonitrile and a short chain alcohol or acetonitrile and a mixture of short chain alcohols.

In an embodiment, the volatile organic liquid chemical component as disclosed in present application including methanol, ethanol, propanol, acetonitrile have the following properties: a refractive index between 1.3-1.5, optical clarity defined as greater than 90% transmittance of incident light of the range of 400-800 nm, preferably more than 95% transmittance of incident light of the range of 400-800 nm, a vapor pressure between 5 kPa-25 kPa at room temperature (22° C.), and less than 1% water content (anhydrous). Additionally, these properties cannot interfere with molecular analytes within the sample tissue and cannot not interfere with the microdissection process.

In an embodiment, the volatile organic liquid as disclosed in present application including methanol, ethanol, propanol, acetonitrile has a vapor pressure in a range with the lower limit being about 7 kPa, 9 kPa, 11 kPa, 13 kPa, 15 kPa and the upper limit being about 17 kPa, 19 kPa, 20 kPa, 22 kPa, 24 kPa.

In an embodiment, the visualization solution has optical clarity more than 90% transmittance of incident light of the range of 400-800 nm. In another embodiment, the visualization liquid has optical clarity more than 95% transmittance of incident light of the range of 400-800 nm.

In an embodiment, FIGS. 3A to 3F shows the effect of Tissue sections imaged before and after the addition of solvents. The solvents such as Acetonitrile (ACN) and Ethanol (EtOH) improved tissue image without harming LCM cap, whereas Isopropanol, Tetrahydrofuran (THF), and Xylene improved tissue image moderately but had effects on the LCM cap.

In an embodiment, the stabilization components have the following properties: absorption of water such that the volatile organic liquid chemical component as disclosed in present application includes less than 1% water.

In an embodiment, the stabilization components have the following properties: absorption of water such that the volatile organic liquid chemical component as disclosed in present application including methanol, ethanol, propanol and acetonitrile have less than 0.9%, 0.7%, 0.6%, 0.5% or less water.

In an embodiment, the stabilization components include hygroscopic salts added to the volatile organic liquid phase such as but not limited to calcium chloride, calcium sulfate, magnesium sulfate, potassium sulfate, or sodium sulfate or other salt with similar properties.

In another embodiment, the hygroscopic salt can be zinc chloride, potassium hydroxide and sodium hydroxide etc.

An embodiment relates to the preservation components have the following properties: a denaturant chemical component that prevents degradation of analytes (i.e. RNA, DNA) within the tissue sample. In an embodiment, the preservation component prevents degradation of analyte within the tissue sample by about less than 5%, 4%, 3%, 2%, 1% or less 1% of the tissue sample.

In an embodiment, the preservation components include of a chaotropic agent. The chaotropic agent can be selected from but not limited to urea or thio-urea, n-butanol, ethanol, lithium, perchlorate, lithium acetate, magnesium chloride, phenol, 2-propanol, sodium dodecyl sulphate etc.

In an embodiment, the visualization solution with refractive index 1.4, improves the resolving power by a factor 1/1.4, similarly the visualization with refractive index of 1.5, improves the resolving power by a factor 1/1.5 etc., similarly solution with the refractive index (n) improves the resolving power by 1/n starting from 1/1.3.

In an embodiment, the visualization solution provides clarity to the sample.

Figure 7:
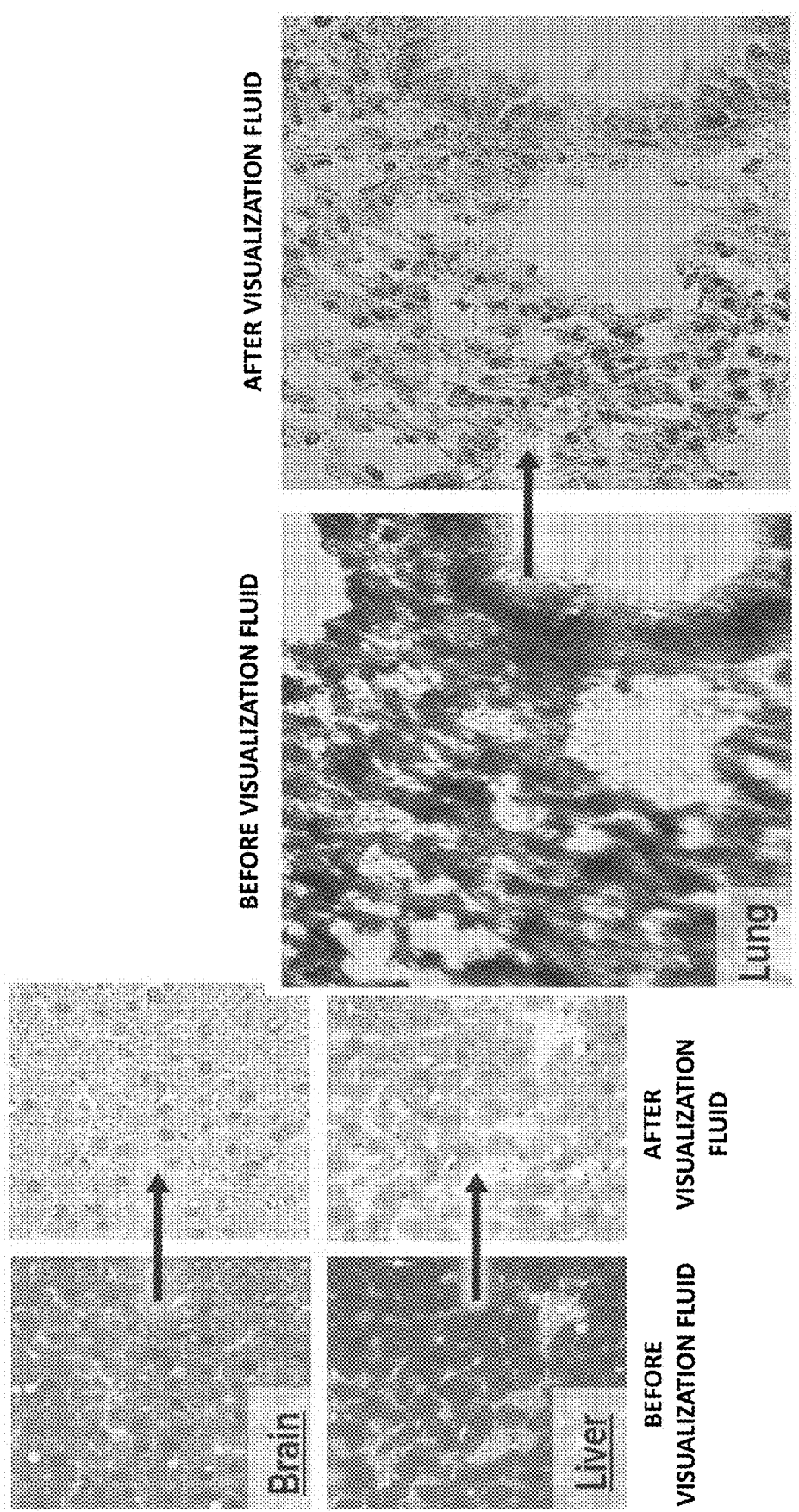
FIG. 7 shows a digital screen image of LCM 40× microscopic image before, and 5 seconds, after application of the visualization fluid. Frozen section stained with H&E. Note nuclear detail evident after visualization refractive index matching.

FIG. 7 shows a digital screen image of LCM 40× microscopic image before, and 5 seconds, after application of the visualization fluid. The Frozen section stained with H&E. The nuclear detail evident after visualization refractive index matching.

In an embodiment, the visualization solution can be sold as a pre-packaged article, to be used for existing molecular diagnostic labs and pathology departments worldwide.

In an embodiment, visualization solution and preservation component housed in a sealed container that is impermeable to water vapor for direct application of the solution to a slide. For example, this container can be integrated into a dispensing method such as a tear-top squeeze applicator for single use application into to tissue slide.

In an embodiment, the tear-top squeeze applicator have the following properties: It includes a material that is inert to degradation via the volatile organic chemical component, contains a bulb or dropper region in which the volatile organic component and stabilization components are sealed, can be opened without any special tools, and contained sufficient volatile organic chemical component to wet at least one histological tissue section.

In an embodiment, the tear-top squeeze applicator may be a plastic pouch with a tear-off or twist off seal.

In an embodiment, after removal of the seal, the tear-top squeeze applicator may include a dropper that can be used to directly apply the volatile organic solution or visualization solution to a tissue surface. In an embodiment, the tear-top squeeze applicator could have a filter paper or filter until in between the bulb containing the liquid and the dispensing spout to avoid dispensing any of the stabilization components, if insoluble in the volatile organic liquid, onto the tissue surface.

Figure 5:
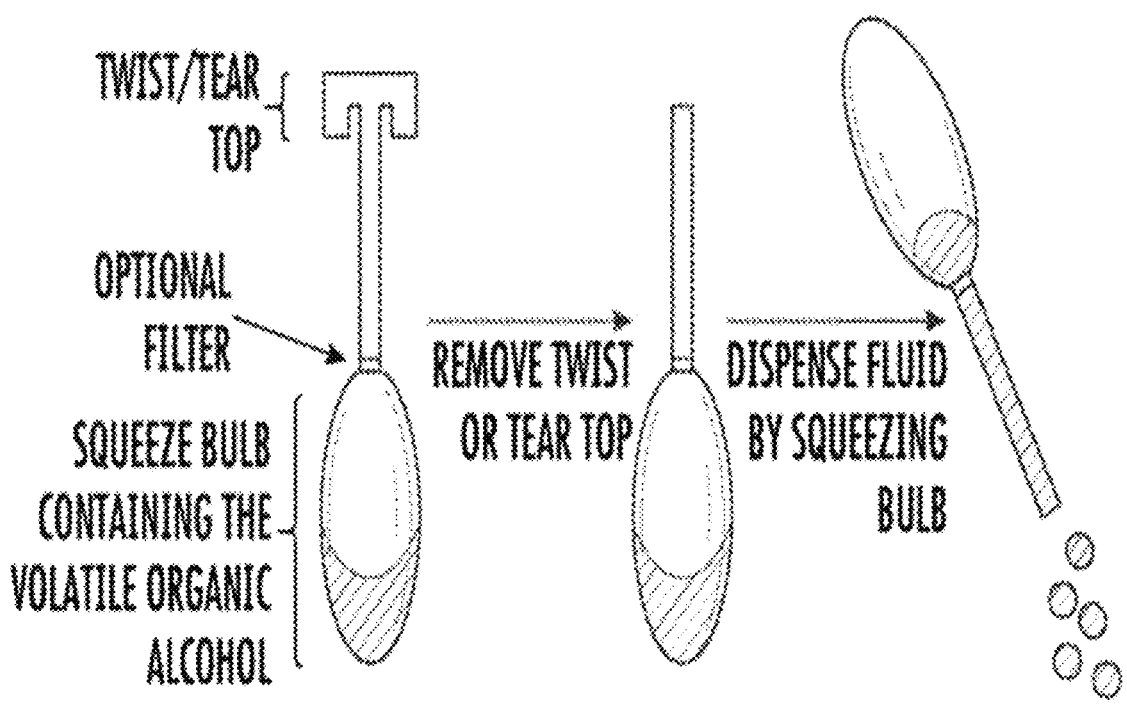
FIG. 5 shows a tear-top squeeze applicator for the administration of visualization fluid to the surface of a histological tissue samples mounted on a substratum. Applicator contains sufficient fluid for at least one slide.

In an embodiment, the tear-top squeeze application is useful for the administration of anhydrous volatile organic component directly to the surface of the tissue mounted on substratum. A diagram of the proposed applicator is shown in FIG. 5.

In an embodiment, the present invention relates to an optimized image capture provided by the visualization solution.

In an embodiment, the present invention relates to a high-throughput LCM system that rapidly digitizes tissue slides without the existing requirement for a cover slip that prevents access to the tissue sample for molecular analysis. This digitized set of images can be analyzed either by a technician or by a developed machine learning algorithm to identify key histological regions of interest (ROIs) of the digitally scanned tissue slide. After downstream biological or molecular analyses, software combines the data into a report displayed on the digital image of the tissue itself. The report will include the biological data within the ROIs the user has pre-selected or that the automated system has selected. Overall, this novel workflow with combined visualization solution will both improve microdissection efficiency and all types of molecular analysis for genomic profiling and proteomic profiling of tissue.

Figure 8:
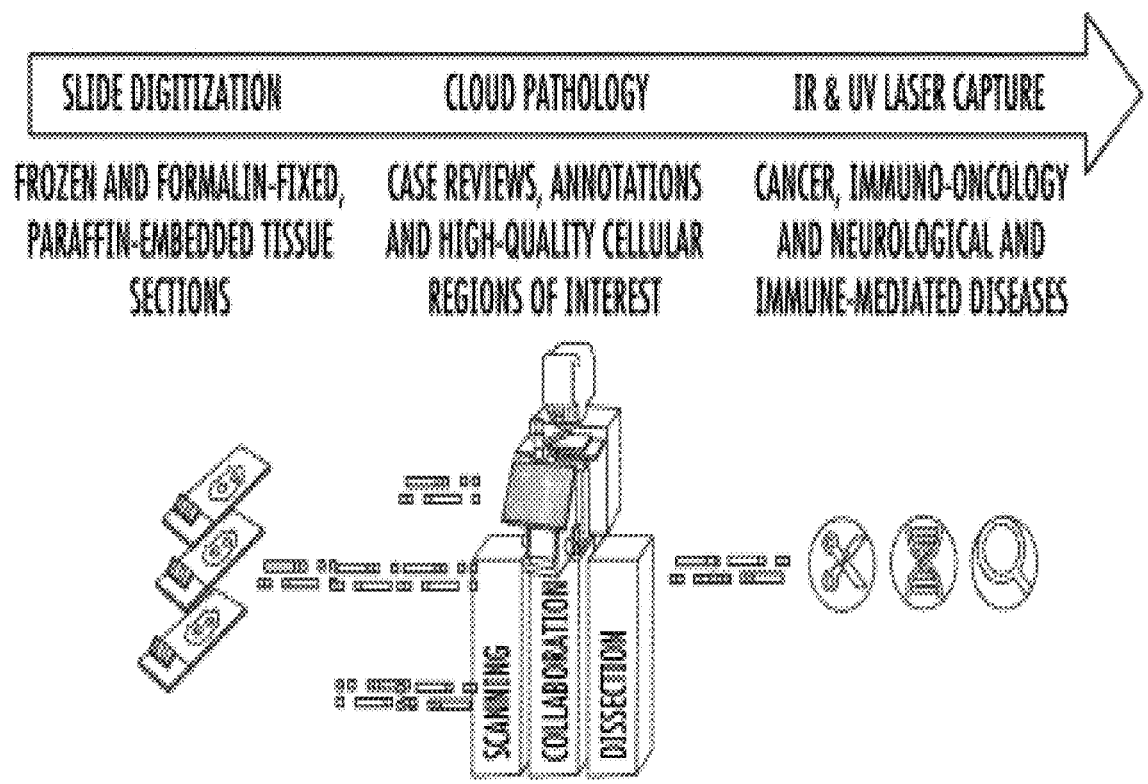
FIG. 8 shows an AccuLift LCM Digital Pathology Solution workflow.
Figure 9:
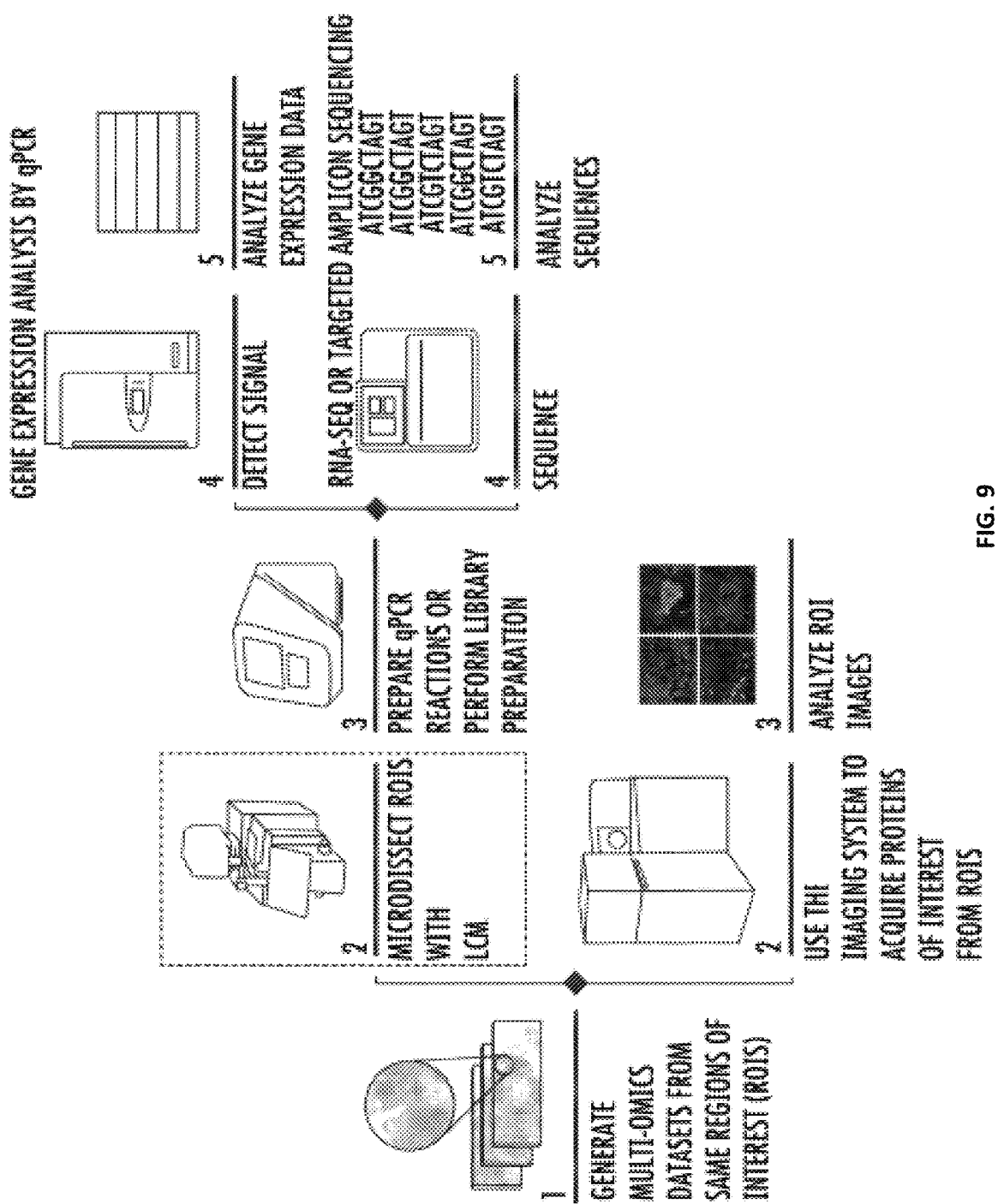
FIG. 9 shows an AccuLift LCM Digital Pathology Solution enabling a multi-omics workflow.

In an embodiment, FIG. 8 and FIG. 9 show workflow and digitization of tissue slides respectively.

In an embodiment, an LCM or similar systems can digitally scan a set/bank of tissue section samples prior to LCM.

In an embodiment, the robotic system will add a tissue sectioned slide to the microscope stage and deposit a transparent cover on top of the tissue sample to protect the microscope lens from the tissue. Next, the visualization solution will be dispensed at the interface between the tissue to clarify the image. The camera system will scan the entire tissue section at various magnification levels and transmit the rendered image to a secure reporting database. After a robotic arm will remove the transparent cover without damaging the tissue section below and move the tissue sectioned slide to a storing area. In this embodiment, the automated system will be able to render images for a large set of sectioned tissue at one time. This would improve workflow efficiency because the user or system will be able to identify which sectioned slides are required for LCM analysis and which sectioned slides do not contain regions that require LCM. In an embodiment, the system is a high-throughput tissue section digitizing system.

Figure 10:
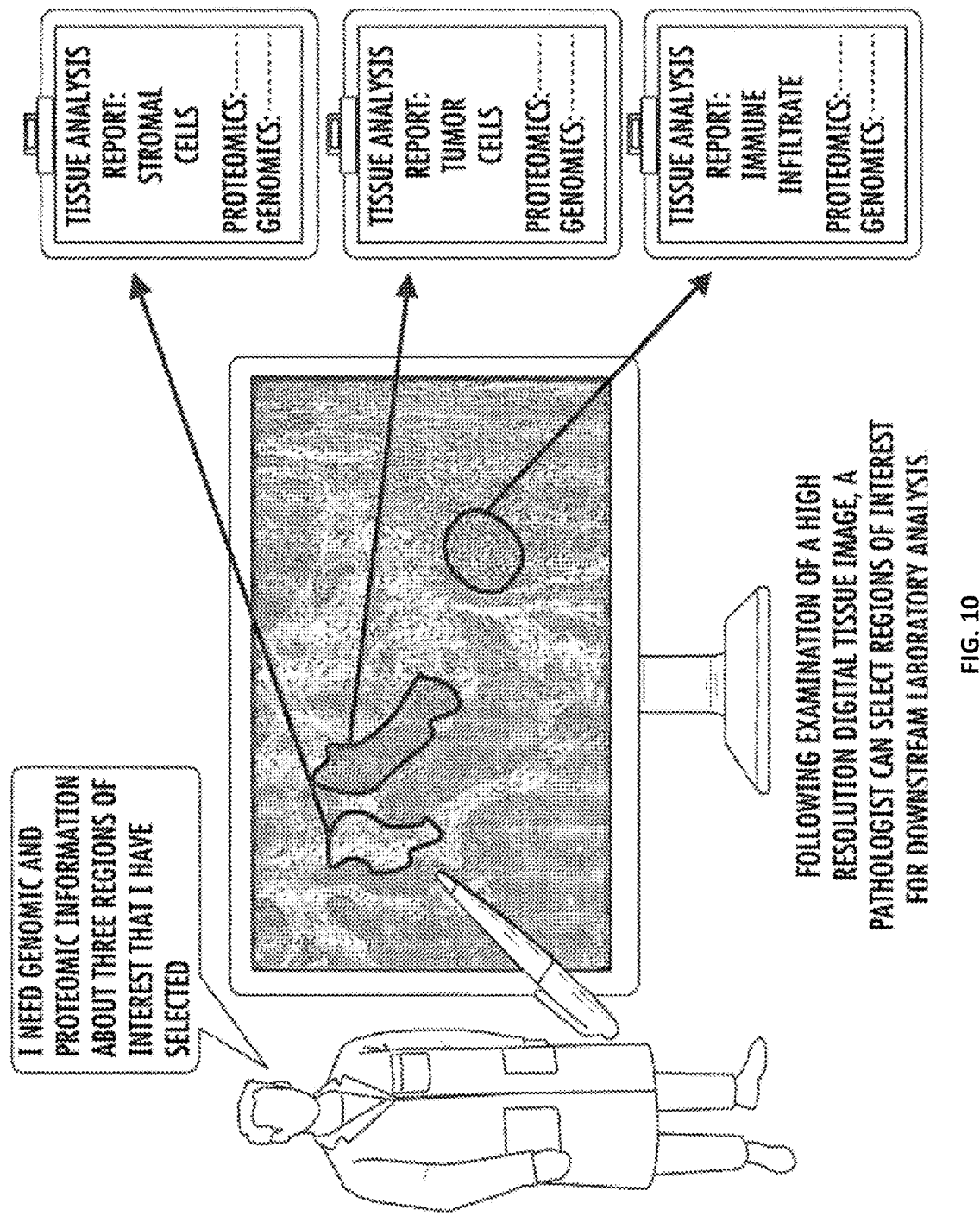
FIG. 10 shows the future of pathology with digital implementation.

In an embodiment, high resolution digital images replace microscopic viewing, improving efficiency. Marked notes on FIG. 10 can be part of the patient's report. A high-quality image is essential for telepathology and the molecular sampling of tissue regions of interest.

In an embodiment, disclosed herein may provide a simple, scalable, secure, fast, minimally resource dependent method, for effective processing, managing, and storing of images and metadata, with anytime-anywhere access to the same. This method is made possible by having the digital pathology images pre-processed, split into smaller components if necessary and transferred to a cloud for further stitching and processing with subsequent compression, viewing and analysis on a cloud-based image viewer and sharing on a cloud-based telepathology service.

A cloud is a virtual network on one of more cloud servers that may be private or public, which permits minimal end-user prerequisites like a workstation and an internet connection. The systems and method according to embodiments of the present application provide delivery of digital pathology processes in a "software as a service" (SAAS) model over the private and/or public clouds.

By using cloud-based technology to host these processes that form the backbone of the digital pathology workflow, systems and methods may be provided that are fast, scalable, and secure and overcomes resource limitations of hardware, bandwidth and network. Moreover, being cloud-based, the systems and method are accessible to the user 24 hours a day, 7 days a week from any chosen place of work.

In an embodiment, the present application relates to a method of automatic region of interest (ROI) identification. The LCM microscope will digitize each slide after the visualization solution has been applied to the surface. The digitized image will then be transmitted to the attending physician or technician for visual inspection or an automated system will pre-select regions of interest within the tissue sample using machine learning.

In an embodiment, the ROI identification system can identify cells and/or cell types of interest, cells undergoing particular cell cycles of interest, and/or tissue/tumor grading. After ROIs are selected by either a user or machine, the standard LCM process and subsequent biological analyses will continue downstream.

In an embodiment, software that displays regions of interest with embedded biological data of that region and tissue section. After LCM and downstream biological analyses, the data will be synthesized into a report. The report will include the biological data within the ROIs the user has pre-selected or that the automated system has selected. The software may be implemented via instructions that may be stored in non-transitory memory and executable by a processor, e.g., a microprocessor of a computing system. The system may include a display, with the software being implemented in the form of a software program which causes display of particular data (e.g., images) according to one or more embodiments.

In an embodiment, the user may scroll over the complete clarified tissue image and view the biological data of different regions of the sectioned sample.

In an embodiment, the reporting system will generate a three-dimensional image of the various tissue sections from a single biopsy and include the integrated biological data from the LCM analyses.

Figure 6:
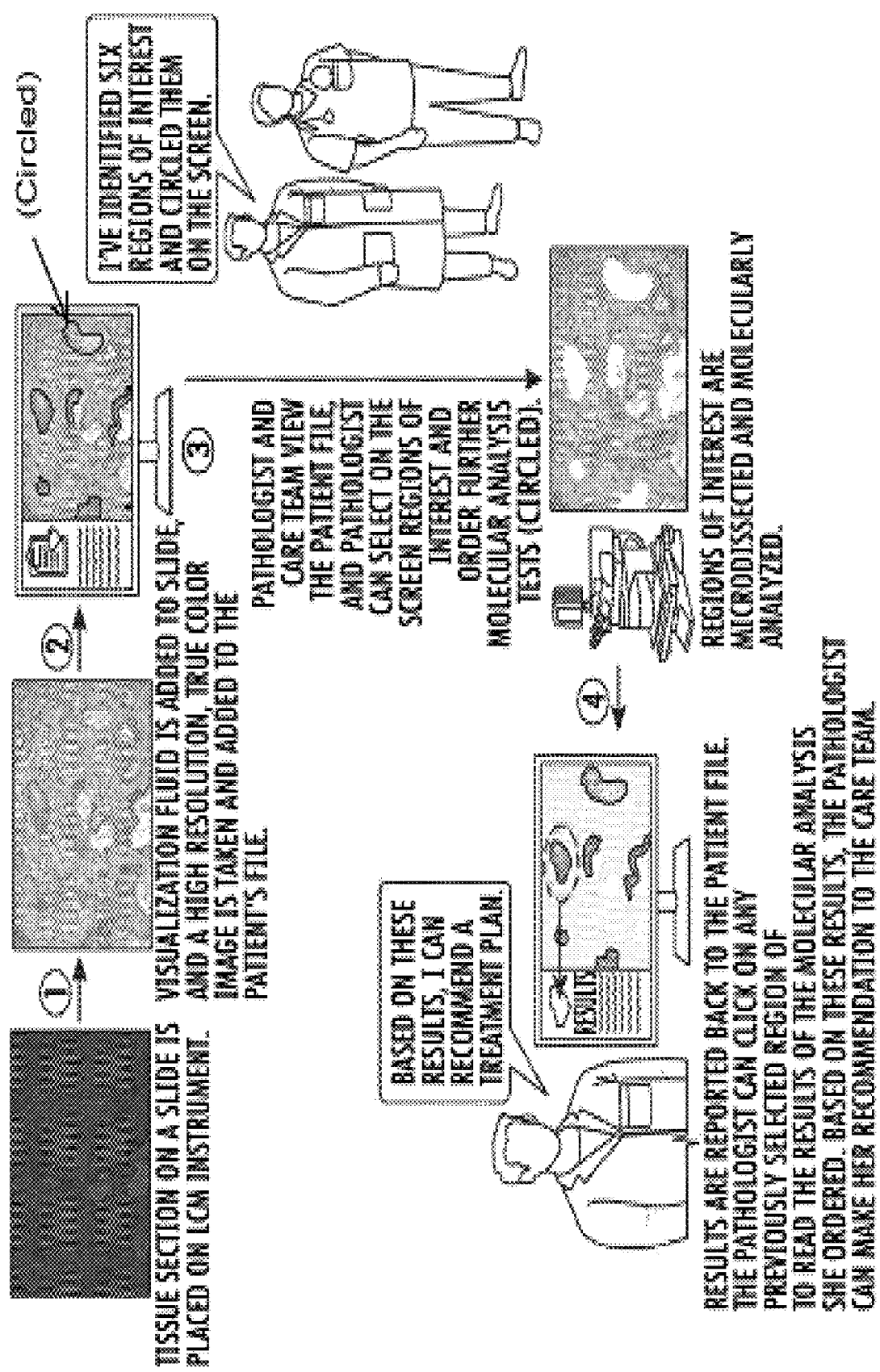
FIG. 6 shows a Region of Interest Identification and Reporting Display for User. For each tissue section, a region of interest (green outlines) will be selected by the user or the operating system. After LCM of the ROIs, a report is generated with the biological results of each ROI of that tissue section. These results can be viewed with the patient's electronic medical records.

In an embodiment, the developed software will show an image of the tissue slide, with selectable regions of interest that a pathologist may request be molecularly analyzed for the presence of various markers. These regions of interest can be selected by the pathologist himself or could be highlighted and tagged directly based on AI (artificial intelligence) in the software that identifies ROIs. Following the molecular analysis, the results will be tagged to the image of the region of interest that was analyzed. This will allow a pathologist to go back to the image and click on different regions of interest to bring up their unique molecular profile. A graphic of what this software may appear as when utilized by a pathologist is shown in FIG. 6.

In an embodiment, the visualization solution can be used for sample preparation for examination using instruments such as any known microscopes.

In an embodiment, the system employing such a visualization solution can be employed for digitized system.

All references, including granted patents and patent application publications, referred herein are incorporated herein by reference in their entirety.

Example 1

A schematic of the use of the visualization fluid is shown in FIG. 1. Tissue cover could be an LCM cap, a film, or other visualization tool. Normally, tissue visualized through an air gap, as in LCM, are dark and features lack distinction. The addition of a visualization fluid allows for restoration of the color and features of the tissue that are visible under a coverslip. An example of this comparison is shown in FIGS. 2A-2B.

Example 2

A broad set of liquids, oils, and media were tested. Failed Visualization Solutions include:
1. Dissolution of the microdissection probe/polymer, damaged tissue microdissection ability, and removal of tissue staining: Commercial mounting media, immersion oils, isopropanol, hexane, tetrahydrofuran, xylene, and toluene.
2. High water content which impedes microdissection and tissue analyte analysis: water.
3. Inability to visualize due to incorrect refractive index and incorrect wavelengths: toluene, Isopropanol.

A broad screen was conducted to examine multiple volatile organic compounds both for their ability to improve the visual image when added to a tissue surface (desired outcome), as well as their ability to dissolve for soften a laser capture microdissection cap comprised of a poly methyl methacrylate body and an ethylene vinyl acetate film surface (undesired outcome). Results from this study are recorded in Table 1.

TABLE 1

Examination of different volatile organic compounds for their ability to improve the visual image.

| Name | Refractive Index | Dissolves Plastic | Improves visual image (0-10, 10 best) |
|---|---|---|---|
| Water | 1.36 | No | — |
| Acetone | 1.34 | No | — |
| Isopropanol | 1.37 | Yes | 1 |
| Hexane | 1.37 | Yes | 6 |
| Tetrahydrofuran | 1.40 | Yes | 7 |
| Xylene | 1.49 | Yes | 10 |
| Toluene | 1.49 | Yes | — |
| Ethanol | 1.36 | No | 9 |
| Acetonitrile | 1.34 | No | 10 |

A focused screen was conducted to examine ethanol and acetonitrile volatile organic compounds both for their ability to improve the visual image in a non-obvious manner when added to a tissue surface (desired outcome), as well as if any improvement in visual image could be obtained by mixing these agents in various proportions or saturating these agents with volatile salts such as ammonium bicarbonate. Results from this study are recorded in Table 2.

TABLE 2

Study on ethanol and acetonitrile to improve visual image.

| Name | Refractive Index (R.I) | Improves visual image (0-10, 10 best) | Sufficiently volatile (Y/N) |
|---|---|---|---|
| Ethanol (EtOH) | 1.36 | 8 | Yes |
| Acetonitrile (ACN) | 1.34 | 8 | Yes |
| 50:50 EtOH: ACN | | 6-7 | Yes |
| 25:75 EtOH: ACN | | 6-7 | Yes |
| 75:25 EtOH: ACN | | 6-7 | Yes |
| 75% ACN with 25% 2M ammonium bicarbonate[3] | | 6-7 | |
| 75% EtOH with 25% 2M ammonium bicarbonate[3] | | Did not dissolve properly | |

Figure 4:
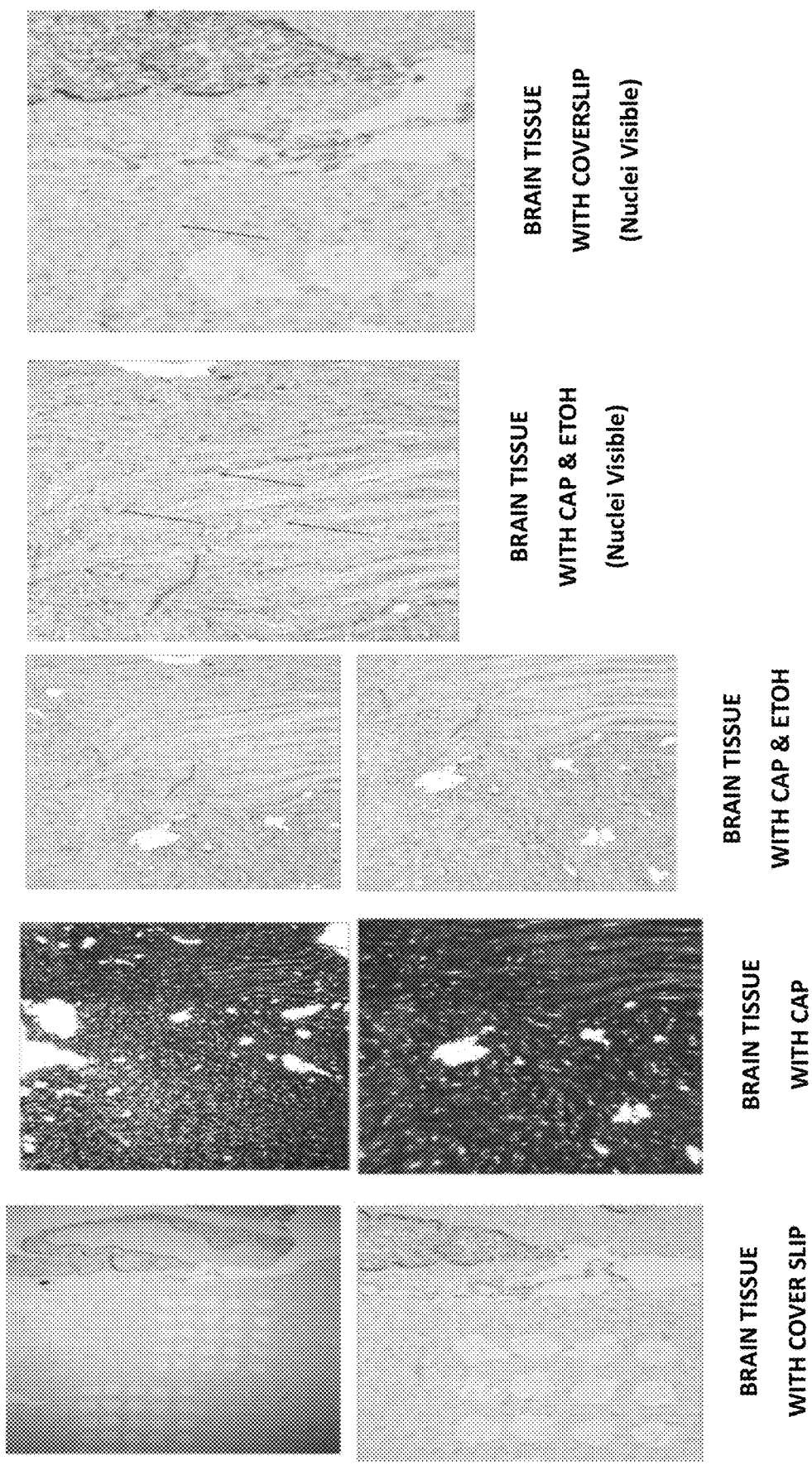
FIG. 4 shows a tissue wet with ethanol generated similar quality visual images as tissue which was imaged with mounting media and a coverslip. Left: brain tissue imaged with a coverslip, imaged through a laser capture microdissection cap, or imaged through a laser capture microdissection cap following administration of ethanol are compared. Right, nuclei of cells in a brain tissue section are visible both by using a traditional coverslip with mounting media and through imaging ethanol-wet tissue through a laser capture microdissection cap.

Based on the performance of ethanol, it was further directly compared to a standard coverslip to see if improved visualization was comparable to the addition of a coverslip. The results of this study are shown in FIG. 4.

REFERENCES

1) Caprette, D. R. (2012). Light Microscopy. Rice University. www.rufrice.edu/-bioslabs/methods/microscopy/microscopy.html.

The invention claimed is:

1. A liquid, comprising: a) an organic component; b) a stabilization component; and c) a preservation component, wherein the organic component, the stabilization component, and the preservation component are different components;
   wherein the organic component is an anhydrous solution comprising less than 1% water content and comprises a volatile organic solution comprising acetonitrile, wherein the volatile organic solution has a refractive index of 1.5 or below;
   wherein the volatile organic solution is not isopropanol, toluene, hexane, tetrahydrofuran and xylene;
   wherein the stabilization component comprises a hygroscopic salt;
   wherein the preservation component comprises a denaturant chemical component comprising a chaotropic agent; and
   wherein the liquid is a visualization solution that is configured to improve resolving power of a lens by 1/1.5.

2. The liquid of claim 1, wherein the volatile organic solution has a vapor pressure of about 5 kPa to about 25 kPa at a temperature about 22° C., and wherein a lower limit of the refractive index is about 1.3.

3. The liquid of claim 1, wherein the organic component is configured to transmit about 90% of an incident light with a wavelength in range of about 400 nm to about 800 nm.

4. The liquid of claim 1, wherein the volatile organic solution further comprises a short-chain alcohol.

5. The liquid of claim 1, wherein the stabilization component is configured to absorb water from the organic component; and the hygroscopic salt is selected from a group consisting of: calcium chloride; calcium sulfate; magnesium sulfate; potassium sulfate; sodium sulfate; and zinc chloride.

6. The liquid of claim 1, wherein the liquid does not dissolve a plastic comprising a poly methyl methacrylate polymer and/or an ethylene vinyl acetate polymer.

7. A kit, comprising: a) an organic component; b) a stabilization component, and c) a preservation component comprising a chaotropic agent, contained within a container comprising a material inert to degradation via the organic component, wherein the organic component and the stabilization component are different components,
   wherein the organic component is an anhydrous solution comprising less than 1% water content and comprises a volatile organic solution comprising acetonitrile, wherein the volatile organic solution has a refractive index of 1.5 or below, wherein the volatile organic solution is not isopropanol, toluene, hexane, tetrahydrofuran and xylene;
   wherein the stabilization component comprises a hygroscopic salt, and
   wherein the organic component, the stabilization component and the preservation component are part of a visualization solution that is configured to improve a resolving power of a lens by 1/1.5.

8. The kit of claim 7, wherein the container is in the form of a squeeze applicator.

9. The kit of claim 7, wherein the visualization solution is configured to preserve one or more molecules of a tissue sample for diagnosis of the tissue sample without interfering with microdissection of the tissue sample.

10. The kit of claim 7, wherein the volatile organic solution has a vapor pressure of about 5 kPa to about 25 kPa at a temperature about 22° C., and wherein a lower limit of the refractive index is about 1.3.

11. The kit of claim 7, wherein the organic component is configured to transmit about 90% of an incident light with a wavelength in range of about 400 nm to about 800 nm.

12. The kit of claim 10, wherein the volatile organic solution further comprises a short-chain alcohol.

13. The kit of claim 7, wherein the stabilization component is configured to absorb water from the organic component; and wherein the hygroscopic salt is selected from a group consisting of: calcium chloride; calcium sulfate; magnesium sulfate; potassium sulfate; sodium sulfate; and zinc chloride.

14. The kit of claim 9, wherein a mixture of the organic component, the stabilization component and the preservation component, is configured to match the refraction index of a microscope lens objective when the tissue sample is wetted with the visualization solution, and the tissue sample is prepared without a coverslip, to be imaged employing the microscope lens.

15. The liquid of claim 1, wherein a mixture of the organic component, the stabilization component; and the preservation component, is configured to match the refraction index of a microscope lens objective, when: a sample is wetted with the liquid; and the sample is prepared, without a coverslip, to be imaged employing the microscope lens.

* * * * *